(12) United States Patent
Takahashi et al.

(10) Patent No.: US 9,752,619 B2
(45) Date of Patent: Sep. 5, 2017

(54) DOUBLE ROW BALL BEARING AND SHAFT SUPPORT DEVICE

(71) Applicant: JTEKT CORPORATION, Osaka-shi, Osaka (JP)

(72) Inventors: Yuzuru Takahashi, Kashiwara (JP); Daisuke Okamoto, Osaka (JP); Kouichirou Naitou, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 211 days.

(21) Appl. No.: 14/687,319

(22) Filed: Apr. 15, 2015

(65) Prior Publication Data

US 2015/0292559 A1    Oct. 15, 2015

(30) Foreign Application Priority Data

Apr. 15, 2014 (JP) .................. 2014-083330

(51) Int. Cl.
| | |
|---|---|
| *F16H 57/037* | (2012.01) |
| *F16C 33/58* | (2006.01) |
| *F16H 48/42* | (2012.01) |
| *F16C 19/18* | (2006.01) |
| *F16C 33/38* | (2006.01) |
| *F16C 33/66* | (2006.01) |
| *F16H 1/14* | (2006.01) |

(52) U.S. Cl.
CPC .......... *F16C 33/586* (2013.01); *F16C 19/182* (2013.01); *F16C 33/3806* (2013.01); *F16C 33/6674* (2013.01); *F16H 48/42* (2013.01); *F16C 33/3856* (2013.01); *F16C 2240/70* (2013.01); *F16C 2361/61* (2013.01); *F16H 1/145* (2013.01); *F16H 57/037* (2013.01); *F16H 2048/423* (2013.01)

(58) Field of Classification Search
CPC .............................. F16H 57/037; F16C 33/586
See application file for complete search history.

(56) References Cited

U.S. PATENT DOCUMENTS 8,371,759 B2 *  2/2013  Fukuda ................. F16C 19/182
                                                          29/898.06

FOREIGN PATENT DOCUMENTS

| DE | 19839481 A1 | 3/2000 |
|---|---|---|
| JP | 2006-234100 A | 9/2006 |

(Continued)

OTHER PUBLICATIONS

Nov. 11, 2015 Extended Search Report issued in European Patent Application No. 15163635.4.

*Primary Examiner* — Derek D Knight
(74) *Attorney, Agent, or Firm* — Oliff PLC

(57) ABSTRACT

A double row ball bearing includes: an outer ring; an inner ring; a plurality of first balls disposed between the outer ring and the inner ring to form a first ball row; a plurality of second balls disposed between the outer ring and the inner ring to form a second ball row having a pitch circle diameter larger than that of the first ball row; an annular first cage having a plurality of first pockets in which the first balls are held; an annular second cage having a plurality of second pockets in which the second balls are held; and an annular portion that covers, together with the outer ring, a portion of each second ball held in the second pocket from the radially outside, the portion being exposed on the outside of the second pocket and oriented radially outward.

7 Claims, 9 Drawing Sheets

(56) References Cited

FOREIGN PATENT DOCUMENTS

| JP | 2007-092860 A | 4/2007 |
|---|---|---|
| JP | 2014-020401 A | 2/2014 |

* cited by examiner

DOUBLE ROW BALL BEARING AND SHAFT SUPPORT DEVICE

INCORPORATION BY REFERENCE

The disclosure of Japanese Patent Application No. 2014-083330 filed on Apr. 15, 2014 including the specification, drawings and abstract is incorporated herein by reference in its entirety.

BACKGROUND OF THE INVENTION

1. Field of the Invention

The invention relates to a double row ball bearing. The invention relates also to a shaft support device including a double row ball bearing.

2. Description of Related Art

As rolling bearings that support a pinion shaft of a differential gear mechanism, tapered roller bearings have conventionally been employed. However, double row ball bearings have recently been employed for the purpose of achieving a reduction of torque (reduction of loss) (see, for example, FIG. 1 in Japanese Patent Application Publication No. 2006-234100 (JP 2006-234100 A)). FIG. 9 is a sectional view illustrating a part of a conventional differential gear mechanism. The differential gear mechanism includes: a case 80; a differential mechanism 81 disposed in the case 80 and including a ring gear 82 and a pinion gear 83; a pinion shaft 84 that rotates together with the pinion gear 83; and a double row ball bearing 90 by which the pinion shaft 84 is rotatably supported.

The double row ball bearing 90 includes: an outer ring 91; an inner ring 92; a plurality of first balls 93 that forms a first ball row; and a plurality of second balls 94 that forms a second ball row. The first balls 93 and the second balls 94 are disposed between the outer ring 91 and the inner ring 92. The first balls 93 and the second balls 94 are in angular contact with raceway grooves of the outer ring 91 and the inner ring 92. The pitch circle diameter of the second ball row formed of the second balls 94 is larger than the pitch circle diameter of the first ball row formed of the first balls 93. A first cage 95 in an annular shape holds the first balls 93 arranged at regular intervals along the circumferential direction. A second cage 96 in an annular shape holds the second balls 94 arranged at regular intervals along the circumferential direction.

The double row ball bearing 90 is disposed near the pinion gear 83, and supports the pinion shaft 84. The ring gear 82 and the pinion gear 83 are lubricated with a lubricant (oil) P1 stored in the case 80, and the double row ball bearing 90 is also lubricated with the lubricant P1. A long dashed double-short dashed line L1 in FIG. 9 represents an oil surface of the lubricant P1.

In the double row ball bearing 90, in order to set the pitch circle diameter of the second ball row formed of the second balls 94 to be larger than the pitch circle diameter of the first ball row formed of the first balls 93, the diameter of one raceway groove of the outer ring 91, on which the second balls 94 roll, is set larger than the diameter of the other raceway groove of the outer ring 91, on which the first balls 93 roll. Thus, as a whole, the inner peripheral surface of the outer ring 91 has such a shape that the diameter thereof is gradually increased toward the pinion gear 83. Hence, when the double row ball bearing 90 rotates, a flow of the lubricant P1 (see an arrow X1 in FIG. 9) is generated between the outer ring 91 and the inner ring 92 (in the internal space of the double row ball bearing 90) in such a manner that the lubricant P1 stored in the case 80 flows from the opposite side (the right side in FIG. 9) of the double row ball bearing 90 from the pinion gear 83, flows through the internal space of the double row ball bearing 90, and is discharged from the pinion gear 83-side (the left side in FIG. 9) of the double row ball bearing 90.

The lubricant P1 stored in the case 80 contains foreign objects, such as machining swarf produced during manufacturing of the case 80, the ring gear 82, and the pinion gear 83, and wear debris produced between the gears 82, 83 during the operation of the differential mechanism 81. Hence, as the volume of the lubricant P1 flowing through the internal space of the double row ball bearing 90 becomes larger, the possibility that the foreign objects contained in the lubricant P1 will be caught between the balls 93, 94 and the raceway grooves of the outer ring 91 and the inner ring 92 increases.

As illustrated in FIG. 9, the lubricant P1 thrown up by the ring gear 82 that is rotating may fall on the second balls 94 of the double row ball bearing 90. In this case as well, the foreign objects contained in the lubricant P1 may be caught between the second balls 94 and the raceway grooves. In addition, rotations of the gears 82, 83 generate a backflow of the lubricant P1 in the case 80. Near the double row ball bearing 90 (the second balls 94), the backflow of the lubricant P1 attempts to proceed toward the second balls 94 (see an arrow X2 in FIG. 9). In this case as well, the foreign objects contained in the lubricant P1 may be caught between the second balls 94 and the raceway grooves.

SUMMARY OF THE INVENTION

When a larger volume of lubricant flows into the internal space of the double row ball bearing 90, the foreign objects contained in the lubricant are more likely to be caught between the balls 94 (93) and the raceway grooves. Consequently, exfoliation of the surfaces of the balls 94 (93) and the raceway grooves occurs, which results in reduction in the bearing service life. In view of this, the invention provides a double row ball bearing and a shaft support device that are configured to hinder foreign objects contained in the lubricant from being stuck in between the balls and the raceway grooves of the inner ring and the outer ring, thereby extending the bearing service life.

A double row ball bearing according to an aspect of the invention includes: an outer ring; an inner ring; a plurality of first balls disposed between the outer ring and the inner ring to form a first ball row; a plurality of second balls disposed between the outer ring and the inner ring to form a second ball row having a pitch circle diameter larger than the pitch circle diameter of the first ball row; a first cage in an annular shape, the first cage having a plurality of first pockets in which the first balls are held; a second cage in annular shape, the second cage having a plurality of second pockets in which the second balls are held; and an annular portion that covers, together with the outer ring, a portion of each of the second balls held in the second pockets from the radially outside, the portion being exposed on the outside of the second pocket and oriented radially outward.

According to the above aspect, for example, even when the lubricant falls from the gear located near the double row ball bearing toward the second balls, or even when (a part of) the double row ball bearing is immersed in the lubricant and the lubricant attempts to flow toward the second balls due to a backflow of the lubricant, such a flow of the lubricant is blocked by the annular portion. Hence, the foreign objects contained in the lubricant are hindered from being stuck in between the second balls and the raceway grooves of the outer ring and the inner ring. This makes it possible to extend the bearing service life. In the double row ball bearing including the balls in the ball rows that differ in pitch circle diameter, a flow of the lubricant is generated between the outer ring and the inner ring in such a manner that the lubricant enters the bearing from the first ball row side and is discharged from the bearing from the second ball row side. A clearance between the annular portion and the cage that holds the second balls in the second ball row functions as a flow-rate reducer, thereby reducing the volume of the lubricant flowing through the internal space between the outer ring and the inner ring. Unlike in the related art in which the balls are exposed (uncovered) on the radially outside, in the invention, the balls are covered by the annular portion and the outer ring from the radially outside. Thus, the lubricant is hindered from being discharged to the outside from the internal space of the bearing even if a centrifugal force is applied. Specifically, the lubricant is hindered from flowing through the internal space of the bearing. Hence, the foreign objects contained in the lubricant are less likely to be stuck in between the second balls and the raceway grooves of the outer ring and the inner ring. This makes it possible to extend the bearing service life.

The second cage may include an outer annular portion located axially outward of the second balls, and a plurality of cage bars extending axially inward from the outer annular portion. A radial dimension of an outer annular clearance between an outer peripheral surface of the outer annular portion and an inner peripheral surface of the annular portion may be equal to or less than 20% of a radial dimension of an annular space between the inner peripheral surface of the annular portion and an outer peripheral surface of an axial end portion of the inner ring, the axial end portion being located on the second ball side. The lubricant flowing through the internal space between the outer ring and the inner ring attempts to flow along the inner peripheral surface of the outer ring. In view of this, the radial dimension of the outer annular clearance is set to be equal to or less than 20% of the radial dimension of the annular space. This enhances the effect of hindering the lubricant from flowing along the inner peripheral surface of the outer ring.

A diameter of an outer peripheral surface of an axial end portion of the inner ring, the axial end portion being located on the second ball side, may be equal to or larger than 70% of a diameter of an inner peripheral surface of the annular portion. In this case, the radial dimension of the annular space between the axial end portion of the inner ring and the annular portion becomes smaller. Specifically, the annular space serves as the outflow end of the passage in the double row ball bearing, through which the lubricant flows. The flow passage area for the lubricant is reduced at this outflow end. This makes it possible to enhance the above-described function as a "flow-rate reducer". Further, the second cage may include an outer annular portion located axially outward of the second balls, and a plurality of cage bars extending axially inward from the outer annular portion. A diameter of an outer peripheral surface of the outer annular portion may be equal to or larger than 80% of a diameter of an inner peripheral surface of the annular portion. In this case, the radial dimension of the clearance (the outer annular clearance) between the annular portion and the outer annular portion becomes smaller. The lubricant flowing through the internal space between the outer ring and the inner ring attempts to flow along the inner peripheral surface of the outer ring. In view of this, the radial dimension of the outer annular clearance is set to be smaller. This enhances the effect of hindering the lubricant from flowing along the inner peripheral surface of the outer ring.

An inner peripheral surface of the annular portion may be a cylindrical surface parallel to the central line of the outer ring, and the cylindrical surface may be a surface that is not subjected to a finishing process. In this case, the raceway grooves of the outer ring to be in contact with the balls are subjected to a finishing process, but the inner peripheral surface of the annular portion located on the extension of the raceway groove is a surface that is not subjected to a finishing process although being a cylindrical surface parallel to the central line of the outer ring. This means that no finishing process is required for the inner peripheral surface of the annular portion. This leads to cost reduction.

The annular portion may be integral with the outer ring, or the annular portion may be an annular member that differs from the outer ring. When the annular portion is an annular member that differs from the outer ring, the annular portion and a conventional outer ring may constitute the double row ball bearing.

A shaft support device according to another aspect of the invention includes: a case; a gear mechanism including a large-diameter gear and a small-diameter gear that are disposed in the case; a shaft that rotates together with the small-diameter gear; and the double row ball bearing according to claim 1, by which the shaft is rotatably supported. With this configuration, in the double row ball bearing, the foreign objects contained in the lubricant are hindered from being stuck in between the balls (particularly, the second balls) and the raceway grooves of the outer ring and the inner ring. This makes it possible to extend the bearing service life. As a result, it is possible to extend the service life of the shaft support device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described with reference to the accompanying drawings.

Figure 1:
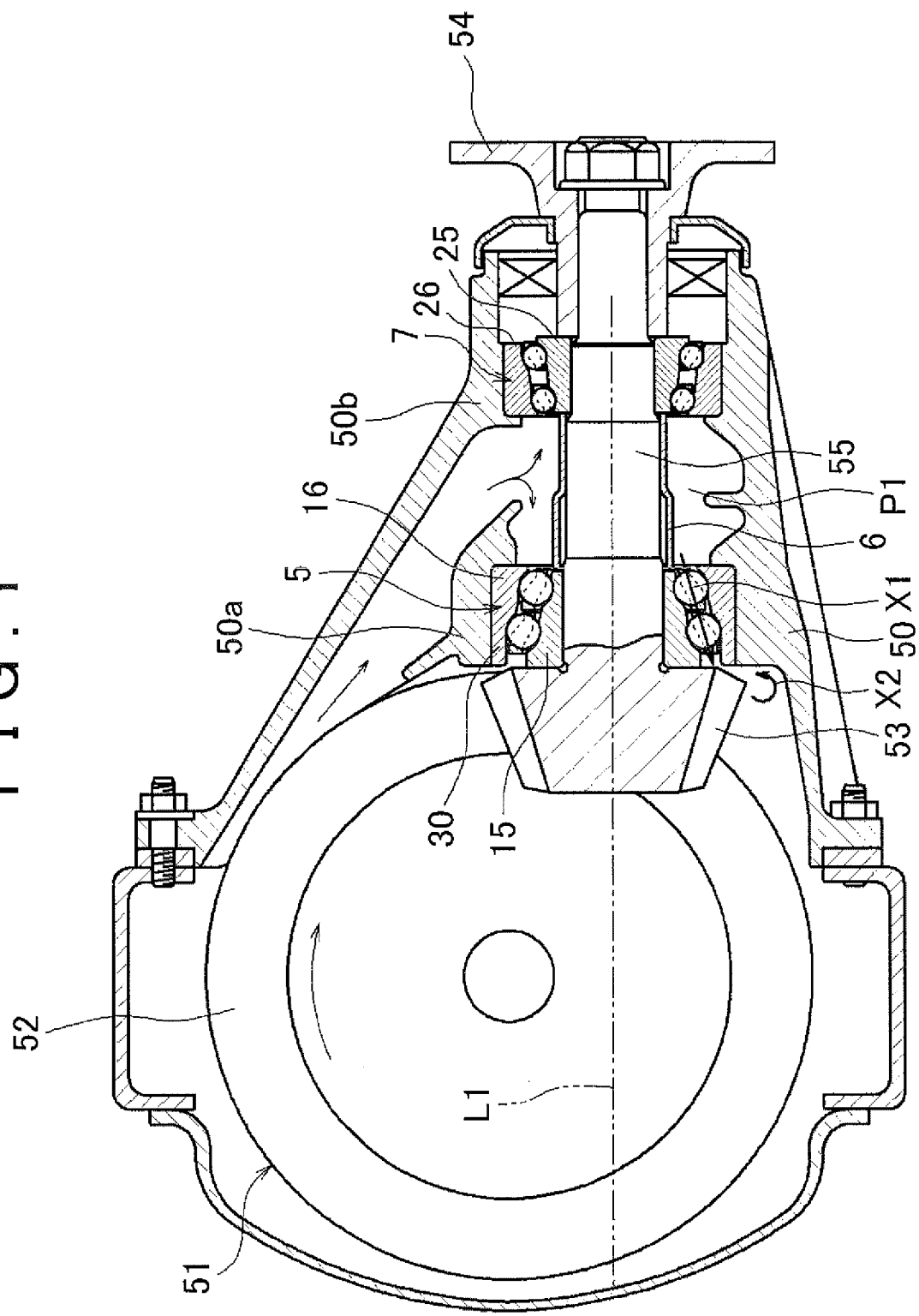
FIG. 1 is a sectional view of a differential gear mechanism including double row ball bearings according to the invention.

A shaft support device described below is a differential gear mechanism mounted on, for example, an automobile. As illustrated in FIG. 1, the shaft support device includes: a case 50; a differential mechanism (gear mechanism) 51; a pinion shaft 55; and double row ball bearings 5, 7 by which the pinion shaft 55 is rotatably supported.

The differential mechanism 51 includes a ring gear 52 that is a large-diameter gear, and a pinion gear 53 that is a small-diameter gear. The ring gear 52 and the pinion gear 53 are disposed in the case 50. The pinion gear 53 and the pinion shaft 55 are formed to be integral with each other so as to rotate together with each other. The pinion gear 53 is disposed at one end of the pinion shaft 55, and is meshed with the ring gear 52. A flange 54 is attached to the other end of the pinion shaft 55, and a drive shaft (not illustrated) is coupled to the flange 54.

The differential mechanism 51, the pinion shaft 55, and the double row ball bearings 5, 7 are accommodated in the case 50. Inside the case 50, there are provided annular walls 50a, 50b. An outer ring 16 and an annular portion 30 (described later) of the double row ball bearing 5 are fitted to the inner peripheral surface of the annular wall 50a, and an outer ring 26 of the double row ball bearing 7 is fitted to the inner peripheral surface of the annular wall 50b. A cylindrical spacer 6 is provided between an inner ring 15 of the double row ball bearing 5 located on the pinion gear 53 side and an inner ring 25 of the double row ball bearing 7 located on the flange 54 side. A lubricant (oil) P1 is stored in the case 50. The lubricant P1 lubricates the ring gear 52 and the pinion gear 53, and also lubricates the double row ball bearings 5, 7. A long dashed double-short dashed line L1 in FIG. 1 represents an oil surface of the lubricant P1.

In the differential gear mechanism, a driving force of the drive shaft (not illustrated) is transmitted through the pinion shaft 55 to the differential mechanism 51 to drive the differential mechanism 51. Axles are coupled respectively to the opposite sides of the differential mechanism 51 via joints (not illustrated). The differential gear mechanism is able to adjust the difference in rotation speed between the axles as appropriate.

Figure 2:
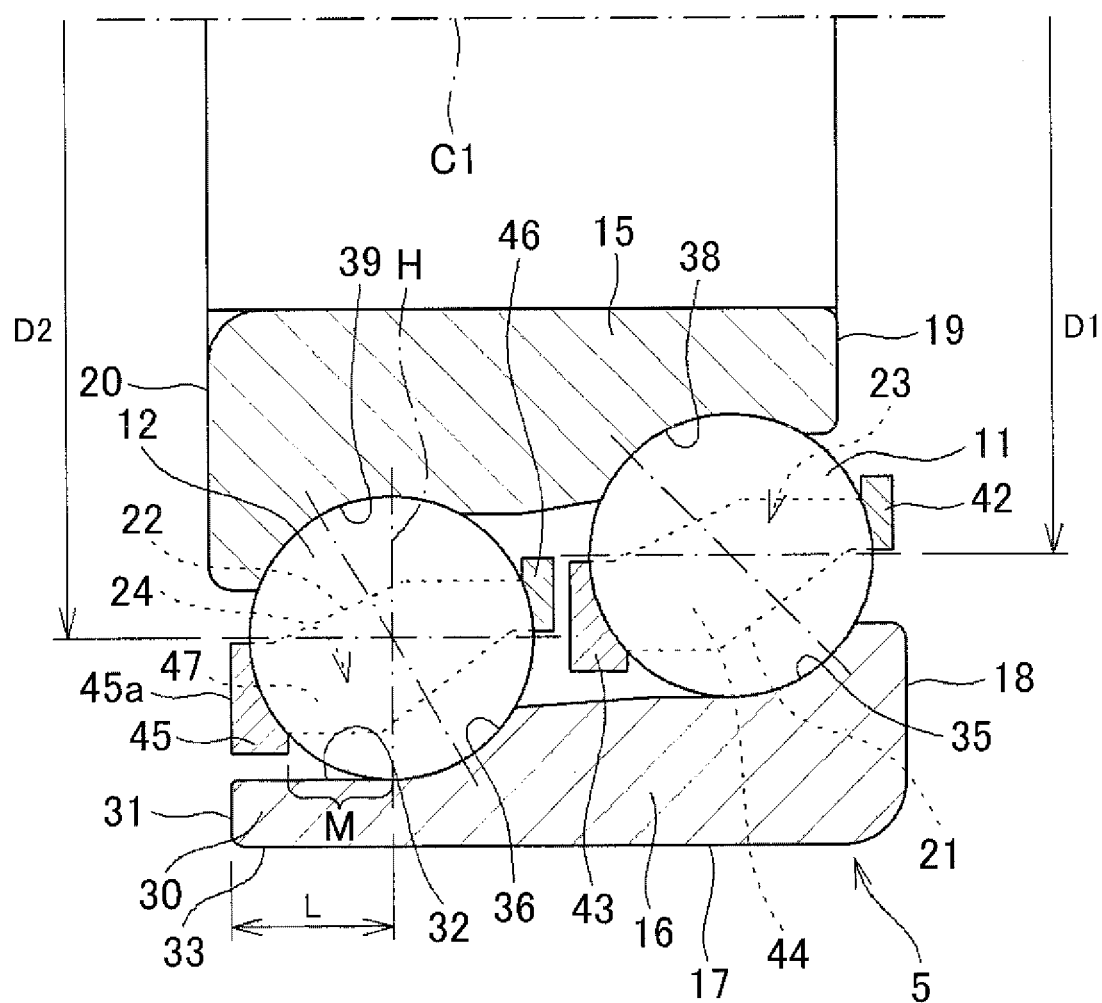
FIG. 2 is a sectional view of the double row ball bearing according to an embodiment of the invention.

The double row ball bearing 5 located on the pinion gear 53 side will be described below. FIG. 2 is a sectional view of the double row ball bearing 5. FIG. 2 is the sectional view of a lower half part of the double row ball bearing 5 illustrated in FIG. 1. The double row ball bearing 5 includes: the outer ring 16; the inner ring 15; a plurality of first balls 11; a plurality of second balls 12; a first cage 21 in an annular shape; and a second cage 22 in an annular shape. The double row ball bearing 5 further includes an annular portion 30. The annular portion 30 according to the present embodiment is integral with the outer ring 16. The annular portion 30 will be described later in detail.

Each of the outer ring 16 and the inner ring 15 is formed of a cylindrical member. The outer ring 16 and the inner ring 15 are disposed so as to be concentric with each other with the balls 11, 12 interposed therebetween. A first ball row (first rolling element row) is formed of the first balls 11 arranged along the circumferential direction. A second ball row (second rolling element row) is formed of the second balls 12 arranged along the circumferential direction. In the present embodiment, the first ball 11 and the second ball 12 have the same diameter. The outer ring 26, the inner ring 25, and the balls 11, 12 are made of bearing steel. The first cage 21 and the second cage 22 are made of synthetic resin.

The inner peripheral surface of the outer ring 16A has a first outer-ring raceway groove 35 and a second outer-ring raceway groove 36. The second outer-ring raceway groove 36 has a diameter larger than that of the first outer-ring raceway groove 35. The outer peripheral surface of the inner ring 15A has a first inner-ring raceway groove 38 and a second inner-ring raceway groove 39. The second inner-ring raceway groove 39 has a diameter larger than that of the first inner-ring raceway groove 38. The first balls 11 are in contact with the first outer-ring raceway groove 35 and the first inner-ring raceway groove 38 with a contact angle to roll on the raceway grooves 35, 38. The second balls 12 are in contact with the second outer-ring raceway groove 36 and the second inner-ring raceway groove 39 with a contact angle to roll on the raceway grooves 36, 39. With the above-described configuration, a pitch circle diameter D2 of the second ball row formed of the second balls 12 is set larger than a pitch circle diameter D1 of the first ball row formed of the first balls 11 (D2>D1).

The first cage 21 has an annular shape as a whole. The first cage 21 includes: an outer annular portion 42 in an annular shape located axially outside the first balls 11; a plurality of cage bars 44 extending axially inward from the outer annular portion 42; and an inner annular portion 43 in an annular shape located axially inside the first balls 11. The cage bars 44 are arranged at regular intervals along the circumferential direction, and couple the outer annular portion 42 to the inner annular portion 43. The second cage 22 has an annular shape as a whole. The second cage 22 includes: an outer annular portion 45 in an annular shape located axially outside the second balls 12; a plurality of cage bars 47 extending axially inward from the outer annular portion 45; and an inner annular portion 46 in an annular shape located axially inside the second balls 12. The cage bars 47 are arranged at regular intervals along the circumferential direction, and couple the outer annular portion 45 to the inner annular portion 46. The axially inside denotes the axially center side of the double row ball bearing 5. This means that a position between the first balls 11 in the first ball row and the second balls 12 in the second ball row is the axially center side. On the other hand, the axially outside includes both axially outsides of the double row ball bearing 5. Specifically, in the example in FIG. 2, with respect to the first balls 11 located on the right side, the right side of the first balls 11 is the axially outside, and with respect to the second balls 12 located on the left side, the left side of the second balls 12 is the axially outside.

In the first cage 21, the regions surrounded by the outer annular portion 42, the inner annular portion 43, and the cage bars 44 adjacent to each other along the circumferential direction define first pockets 23 in which the first balls 11 are held. One ball 11 is disposed in each first pocket 23. The first pockets 23 are arranged along the circumferential direction, thereby allowing the first cage 21 to hold the first balls 11 arranged at regular intervals along the circumferential direction. In the second cage 22, the regions surrounded by the outer annular portion 45, the inner annular portion 46, and the cage bars 47 adjacent to each other along the circumferential direction define second pockets 24 in which the second balls 12 are held. One ball 12 is disposed in each second pocket 24. The second pockets 24 are arranged along the circumferential direction, thereby allowing the second cage 22 to hold the second balls 12 arranged at regular intervals along the circumferential direction.

In the above-described configuration, the first balls 11 that form the first ball row are disposed between the outer ring 16 and the inner ring 15, the second balls 12 that form the second ball row are disposed between the outer ring 16 and the inner ring 15, and the first balls 11 and the second balls 12 are respectively held by the first cage 21 and the second cage 22. Thus, the inner ring 15 and the outer ring 16 are rotatable relative to each other.

The annular portion 30 will be described below. As described above, the annular portion 30 illustrated in FIG. 2 is integral with the outer ring 16, and is formed of a portion extending from the outer ring 16 along the axial direction. In the present embodiment, an imaginary plane H that is perpendicular to a central line C1 of the outer ring 16 and that extends through the center of each second ball 12 is defined as a boundary, and a portion located axially outward of the boundary (on the left side of the boundary, in FIG. 2) is defined as the annular portion 30. The outer ring 16, the inner ring 15, the cages 21, 22, and the annular portion 30 are disposed so as to be concentric with each other. Thus, the central lines of the inner ring 15, the cages 21, 22, and the annular portion 30 coincide with the central line C1 of the outer ring 16.

The annular portion 30 has a short cylindrical shape, and an inner peripheral surface 32 thereof has a cylindrical shape axially extending from the large-diameter side end of the second outer-ring raceway groove 36. An outer peripheral surface 33 of the annular portion 30 has a cylindrical shape axially extending from an outer peripheral surface 17 of the outer ring 16. The annular portion 30 illustrated in FIG. 2 has such an axial length L that the axial position of an axially outer end surface 31 of the annular portion 30 coincides with the axial position of an axially outer end surface 45a of the outer annular portion 45 of the second cage 22. Out of both axial end surfaces of the outer ring 16, an axial end surface 18 on the opposite side of the outer ring 16 from the annular portion 30 is located axially outward of an axial end surface 19 of the inner ring 15. The axial end surface 19 is located on the opposite side of the inner ring 15 from the annular portion 30.

The annular portion 30 may have a configuration other than the configuration illustrated in FIG. 2, and the axial length L may be changed. For example, as illustrated in FIG. 3A to FIG. 3C, the annular portion 30 may have any one of the configurations according to the following modified examples 1) to 3).

Figure 3A:
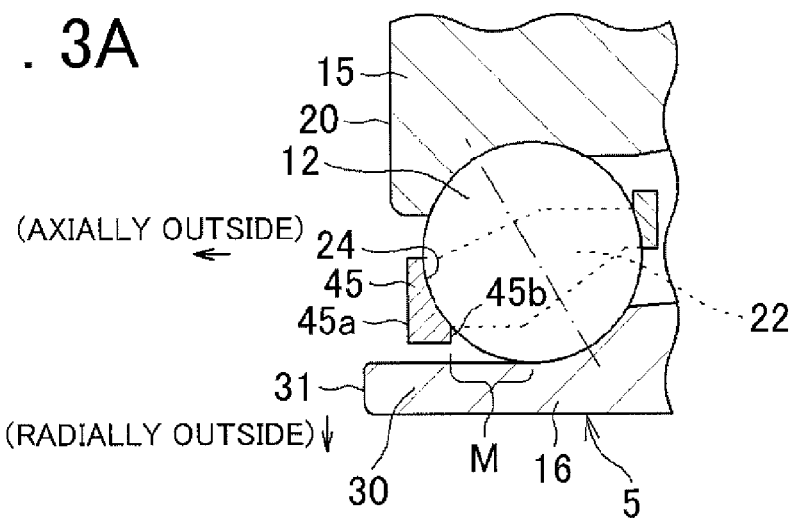
FIG. 3A to FIG. 3C are views each illustrating an annular portion according to a modified example of the embodiment.
Figure 3B:
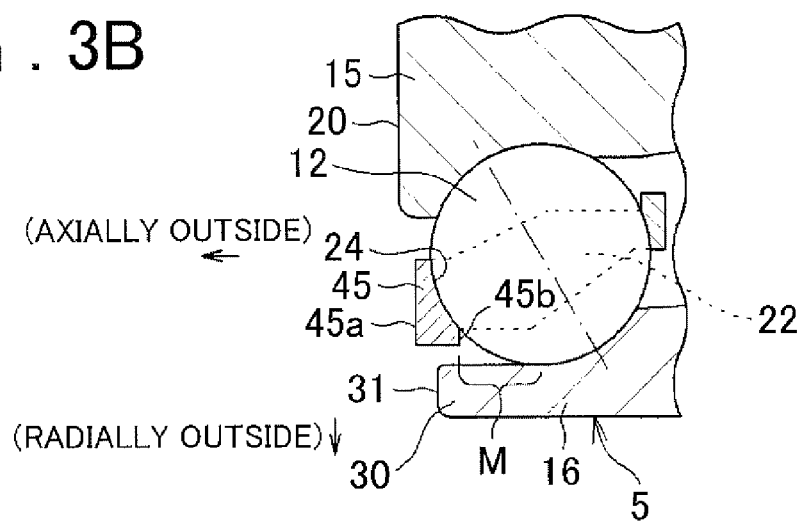
Figure 3C:
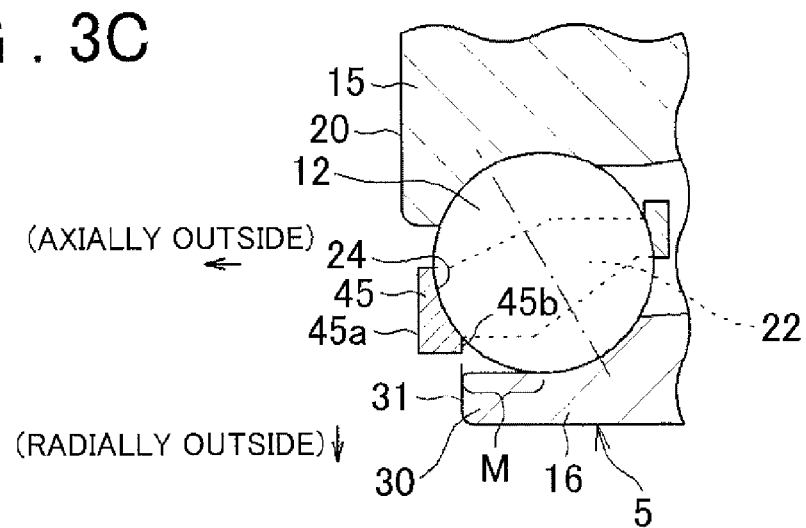

1) The annular portion 30 may have such a configuration that the axially outer end surface 31 of the annular portion 30 is located at a position axially outward of the axially outer end surface 45a of the outer annular portion 45 (see FIG. 3A).
2) The annular portion 30 may have such a configuration that the axially outer end surface 31 of the annular portion 30 is located at an axial position between the axially outer end surface 45a and an axially inner end surface 45b of the outer annular portion 45 (see FIG. 3B).
3) The annular portion 30 may have such a configuration that the axial position of the axially outer end surface 31 of the annular portion 30 coincides with the axial position of the axially inner end surface 45b of the outer annular portion 45 (see FIG. 3C).

Specifically, according to the embodiment illustrated in FIG. 2 and the modified examples illustrated in FIG. 3A to FIG. 3C, the axial position of the axially outer end surface 31 of the annular portion 30 is not limited to any particular positions as long as the axially outer end surface 31 is located at an axial position that coincides with the axial position of the axially inner end surface 45b of the outer annular portion 45, or at an axial position axially outward of the axially inner end surface 45b of the outer annular portion 45. The second pockets 24 are defined by a concave surface of the outer annular portion 45, and are located at positions axially inward of the outer annular portion 45. The axially inner end surface 45b is a surface located at an axially innermost position within the outer annular portion 45. In each of the modified examples illustrated in FIG. 3A to FIG. 3C, the outer annular portion 45 has, on its axially inner side, the axially inner end surface 45b that is a surface perpendicular to the central line of the outer ring 16 in addition to the concave surface that defines the second pockets 24. In the modified example 1), the axial position of the axially outer end surface 31 of the annular portion 30 is located axially outward of the axial end surface 20 of the inner ring 15. In this case, the annular portion 30 needs to have such an axial length that the annular portion 30 does not come into contact with the other components and portions located near the double row ball bearing 5.

As described above, according to the embodiment illustrated in FIG. 2 and the modified examples illustrated in FIG. 3A to FIG. 3C, the annular portion 30 covers, together with the outer ring 16, the entirety of a portion of each of the second balls 12 held in the second pockets 24 of the second cage 22, from the radially outside. The portion of each second ball 2 is exposed on the outside of the second pocket 24 and is oriented radially outward. The portion of each second ball 12, which is covered with the annular portion 30, is indicated as a region M in each of FIG. 2 and FIG. 3A to FIG. 3C.

Figure 9:
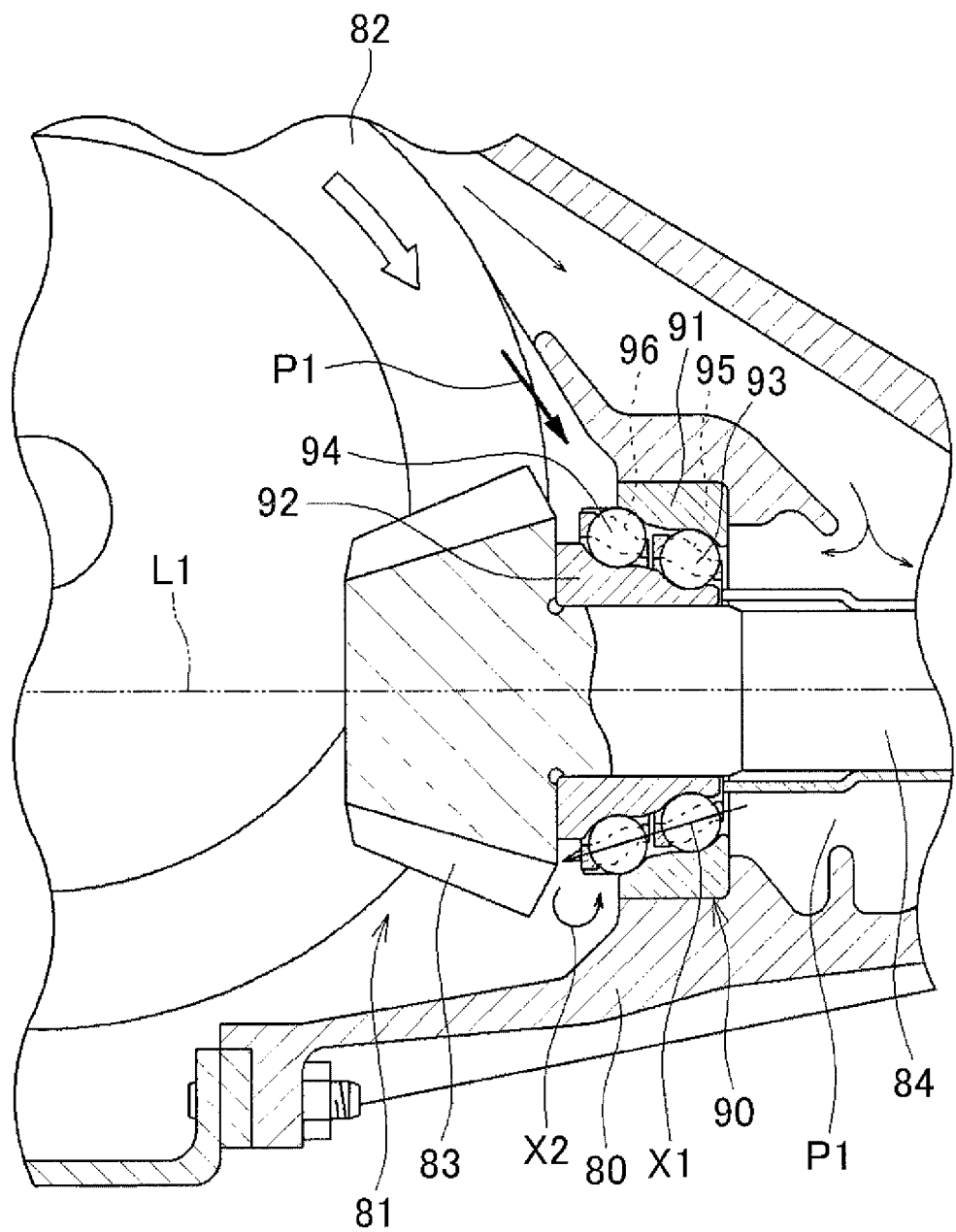
FIG. 9 is a sectional view illustrating a part of a conventional differential gear mechanism.

The lubricant P1 stored in the case 50 as illustrated in FIG. 1 contains foreign objects, such as machining swarf produced during manufacturing of the case 50, the ring gear 52, and the pinion gear 53, and wear debris produced between the gears 52, 53 during the operation of the differential mechanism 51. As in the related art described above with reference to FIG. 9, in each of the embodiment of the invention illustrated in FIG. 2 and the modified examples of the embodiment illustrated in FIG. 3A to FIG. 3C, the lubricant P1 thrown up by the ring gear 52 that is rotating (see FIG. 1) attempts to fall on the double row ball bearing 5. In addition, rotations of the ring gear 52 and the pinion gear 53 generate a backflow of the lubricant P1 in the case 50, and the backflow of the lubricant P1 attempts to proceed toward the second balls 12 (see an arrow X2 in FIG. 1). If the lubricant P1 containing the foreign objects enters the internal space of the double row ball bearing 5 and the foreign objects contained in the lubricant P1 are caught between the balls 11 (12) and the raceway grooves 36, 39 (35, 38) of the outer ring 16 and the inner ring 15, exfoliation of the surfaces of the balls 11 (12) and the raceway grooves 36, 39 (35, 38) may occur, which results in reduction in the bearing service life.

In view of this, in the double row ball bearing 5 according to each of the embodiment illustrated in FIG. 2 and the modified examples illustrated in FIG. 3A to FIG. 3C, the annular portion 30 covers, together with the outer ring 16, the entirety of the portion of each second ball 12, from the radially outside. The portion of each second ball 2 is exposed on the outside of the second pocket 24 and is oriented radially outward. Due to this configuration, even when the lubricant falls from the pinion gear 53 located near the double row ball bearing 5 toward the second balls 12, or even when a part of the double row ball bearing 5 is immersed in the lubricant P1 and the lubricant P1 attempts to flow toward the second balls 12 due to a backflow of the lubricant P1, such a flow of the lubricant P1 is blocked by the annular portion 30. Hence, the foreign objects contained in the lubricant P1 are hindered from being stuck in between the second balls 12 and the raceway grooves 36, 39. This makes it possible to extend the bearing service life.

The following description will be provided with reference to FIG. 2, which is used as a representative example. In the double row ball bearing 5 according to each of the embodiment illustrated in FIG. 2 and the modified examples illustrated in FIG. 3A to FIG. 3C, the second outer-ring raceway groove 36 on which the second balls 12 roll has a diameter larger than that of the first outer-ring raceway groove 35 on which the first balls 11 roll, and the inner peripheral surface of the outer ring 16 has such a shape that the diameter thereof is increased stepwise toward the pinion gear 53 as a whole. Thus, rotation of the inner ring 15 of the double row ball bearing 5 generates a flow of the lubricant P1 (see an arrow X1 in FIG. 1) between the outer ring 16 and the inner ring 15 (in the internal space of the double row ball bearing 5) in such a manner that the lubricant P1 stored in the case 50 enters the double row ball bearing 5 from the first ball row side (the right side in FIG. 1), and is discharged from second ball row side (the left side in FIG. 1) of the double row ball bearing 5. Specifically, the annular internal space is formed between the outer ring 16 and the inner ring 15, and this space serves as a passage (flow passage) through which the lubricant P1 flows.

In the double row ball bearing 5 according to each of the embodiment illustrated in FIG. 2 and the modified examples illustrated in FIG. 3A to FIG. 3C, the annular portion 30 covers, together with the outer ring 16, the entirety of the portion of each second ball 12, from the radially outside. The portion of each second ball 2 is exposed on the outside of the second pocket 24 and is oriented radially outward. With this configuration, a clearance between the inner peripheral surface 32 of the annular portion 30 and the second cage 22 functions as a "flow-rate reducer" for the lubricant P1 in the flow passage formed between the outer ring 16 and the inner ring 15, thereby reducing the volume of the lubricant P1 flowing through the flow passage. Thus, the foreign objects contained in the lubricant P1 are hindered from being stuck in between the first balls 11 and the raceway grooves 35, 38 and in between the second balls 12 and the raceway grooves 36, 39. This makes it possible to extend the bearing service life. Unlike in the related art where the balls 94 (see FIG. 9) are exposed (uncovered) radially outward, in each of the embodiment illustrated in FIG. 2 and the modified examples illustrated in FIG. 3A to FIG. 3C, the second balls 12 are covered with the annular portion 30 from the radially outside and thus the lubricant P1 is hindered from being discharged from the internal space of the bearing even if a centrifugal force is applied. Specifically, the lubricant P1 is hindered from flowing through the internal space of the bearing. Hence, the foreign objects contained in the lubricant P1 are less likely to be stuck in between the second balls 12 and the raceway groove 36. This makes it possible to extend the bearing service life.

The first outer-ring raceway groove 35 and the second outer-ring raceway groove 36 of the inner peripheral surface of the outer ring 16 according to each of the embodiment and the modified examples are subjected to grinding as a finishing process subsequent to cutting. In contrast to this, the inner peripheral surface 32 of the annular portion 30 is a cylindrical surface extending parallel to the central line C1 (see FIG. 2) of the outer ring 16, and the inner peripheral surface 32 is a straight surface that has not been subjected to a finishing process. Specifically, no grinding has been carried out on the inner peripheral surface 32 of the annular portion 30. As described above, the raceway grooves 35, 36 of the outer ring 16 to be in contact with the second balls 12 are subjected to a finishing process (grinding), but the inner peripheral surface 32 of the annular portion 30 located on the extension of the second outer-ring raceway groove 36 is a surface that is not subjected to a finishing process (grinding). This means that no finishing process is required for the inner peripheral surface 32 of the annular portion 30. This makes it possible to reduce the manufacturing cost for the double row ball bearing 5.

Figure 4:
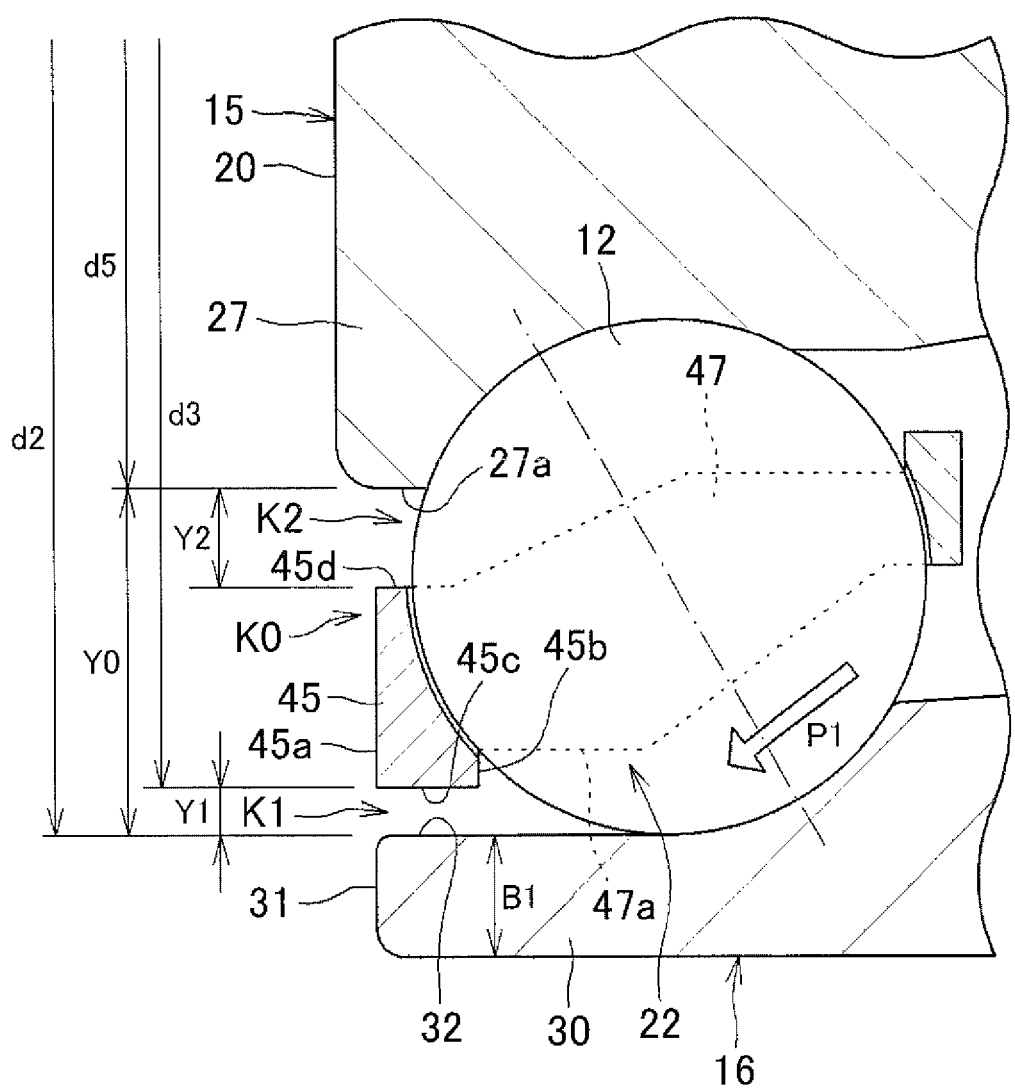
FIG. 4 is an enlarged sectional view illustrating the annular portion and the vicinity thereof.

The above-described function as a "flow-rate reducer" will be described in more detail with reference to FIG. 4. FIG. 4 is an enlarged sectional view illustrating the annular portion 30 and the vicinity thereof. A clearance between an outer peripheral surface 45c of the outer annular portion 45 of the second cage 22 and the inner peripheral surface 32 of the annular portion 30 is defined as an outer annular clearance K1, and a radial dimension of the outer annular clearance K1 is defined as Y1. A space between an outer peripheral surface 27a of an axial end portion (shoulder portion) 27 of the inner ring 15, which is located on the second ball 12 side, and the inner peripheral surface 32 of the annular portion 30 is defined as an annular space K0, and a radial dimension of the annular space K0 is defined as Y0. In the present embodiment, the radial dimension Y1 is set to be equal to or less than 20% of the radial dimension Y0 (Y1/Y0≤20%). The radial dimension Y1 of the outer annular clearance K1 is preferably equal to or less than 60% of a radial dimension (thickness) B1 of the annular portion 30 (Y1/B1≤60%).

In this case, the lubricant P1 that flows through the internal space between the outer ring 16 and the inner ring 15 attempts to flow along the inner peripheral surface of the outer ring 16. In view of this, the radial dimension Y1 of the outer annular clearance K1 is set to be equal to or less than 20% of the radial dimension Y0 of the annular space K0, and thus the flow passage area for the lubricant P1 flowing along the outer ring 16 is reduced. This enhances the effect of hindering the lubricant P1 from flowing along the outer ring 16. This means that it is possible to effectively reduce the volume of the lubricant P1 that flows through the internal space of the bearing. FIG. 4 is an enlarged view of the annular portion 30 and the vicinity thereof illustrated in FIG. 2. Similarly, by applying the configuration, in which the condition "Y1/Y0≤20%" is satisfied, to each of the forms illustrated in FIG. 3A to FIG. 3C, it is possible to more effectively reduce the volume of the lubricant P1 that flows through the internal space of the bearing.

As illustrated in FIG. 4, a clearance between an inner peripheral surface 45d of the outer annular portion 45 of the second cage 22 and the outer peripheral surface 27a of the axial end portion (shoulder portion) 27 of the inner ring 15 is defined as an inner annular clearance K2, and a radial dimension of the inner annular clearance K2 is defined as Y2. The sum of the radial dimension Y1 of the outer annular clearance K1 and the radial dimension Y2 of the inner annular clearance K2 (Y1+Y2) is set to be equal to or less than 50% of the radial dimension Y0 of the annular space K0 between the inner ring 15 and the annular portion 30 (Y1+Y2≤50% of Y0).

In this case, an annular space is formed between the outer ring 16 and the inner ring 15, and the space functions as a passage (flow passage) through which the lubricant P1 flows. The annular space K0 between the inner ring 15 and the annular portion 30 is located on the extension of the space. The flow passage area for the lubricant P1 is reduced in the annular space K0, which serves as an outflow end of the passage (flow passage). This makes it possible to enhance the function as a "flow-rate reducer".

As illustrated in FIG. 4, the diameter of the outer peripheral surface 27a of the axial end portion (shoulder portion)

27 of the inner ring 15 is defined as d5, and the diameter of the inner peripheral surface 32 of the annular portion 30 is defined as d2. In the present embodiment, the diameter d5 of the outer peripheral surface 27a of the axial end portion (shoulder portion) 27 is set to be equal to or larger than 70% of a diameter d2 of the inner peripheral surface 32 of the annular portion 30 (d5/d2≥70%). In this case, the radial dimension Y0 of the annular space K0 between the axial end portion (shoulder portion) 27 of the inner ring 15 and the annular portion 30 is set to be smaller. Specifically, the annular space K0 serves as the outflow end of the passage (flow passage) through which the lubricant P1 flows as described above. The radial dimension Y0 of the annular space K0 is set to be smaller, whereby the flow passage area for the lubricant P1 is reduced at this outflow end. This makes it possible to enhance the above-described function as a "flow-rate reducer".

The diameter of the outer peripheral surface 45c of the outer annular portion 45 of the second cage 22 is defined as d3. In the present embodiment, the diameter d3 of the outer peripheral surface 45c of the outer annular portion 45 is set to be equal to or larger than 80% of the diameter d2 of the inner peripheral surface 32 of the annular portion 30 (d3/d2≥80%). In this case, the radial dimension Y1 of the outer annular clearance K1 between the annular portion 30 and the outer annular portion 45 is set to be smaller. The lubricant P1 flowing through the internal space between the outer ring 16 and the inner ring 15 attempts to flow along the inner peripheral surface of the outer ring 16. In view of this, the radial dimension Y1 of the outer annular clearance K1 is set to be smaller, and thus the effect of hindering the lubricant P1 from flowing along the inner peripheral surface of the outer ring 16 is enhanced.

In the present embodiment, the radial dimension Y1 of the outer annular clearance K1 is set to be smaller than the radial dimension Y2 of the inner annular clearance K2. Specifically, the radial dimension Y1 of the outer annular clearance K1 is set to be equal to or less than 45% of the radial dimension Y2 of the inner annular clearance K2 (Y1/Y2≤45%). In other words, the outer annular clearance K1 is set to be smaller in the radial direction than the inner annular clearance K2 for the following reason.

The lubricant P1 flowing through the internal space between the outer ring 16 and the inner ring 15 attempts to flow along the inner peripheral surface of the outer ring 16. In view of this, the outer annular clearance K1 is set to be smaller in the radial direction. This enhances the effect of hindering the lubricant P1 from flowing along the inner peripheral surface of the outer ring 16.

Due to the configuration in which the condition "Y1/Y0≤20%" is satisfied, the configuration in which the condition "Y1+Y2≤50% of Y0" is satisfied, and the configuration in which the condition "d3/d2≥80%" is satisfied, the outer annular portion 45 is configured to project radially outward from each cage bar 47. Specifically, in the second cage 22, the outer peripheral surface 45c of the outer annular portion 45 is located radially outward of a radially outer surface 47a of each cage bar 47. This configuration allows the radial dimension Y1 to be smaller.

Figure 5:
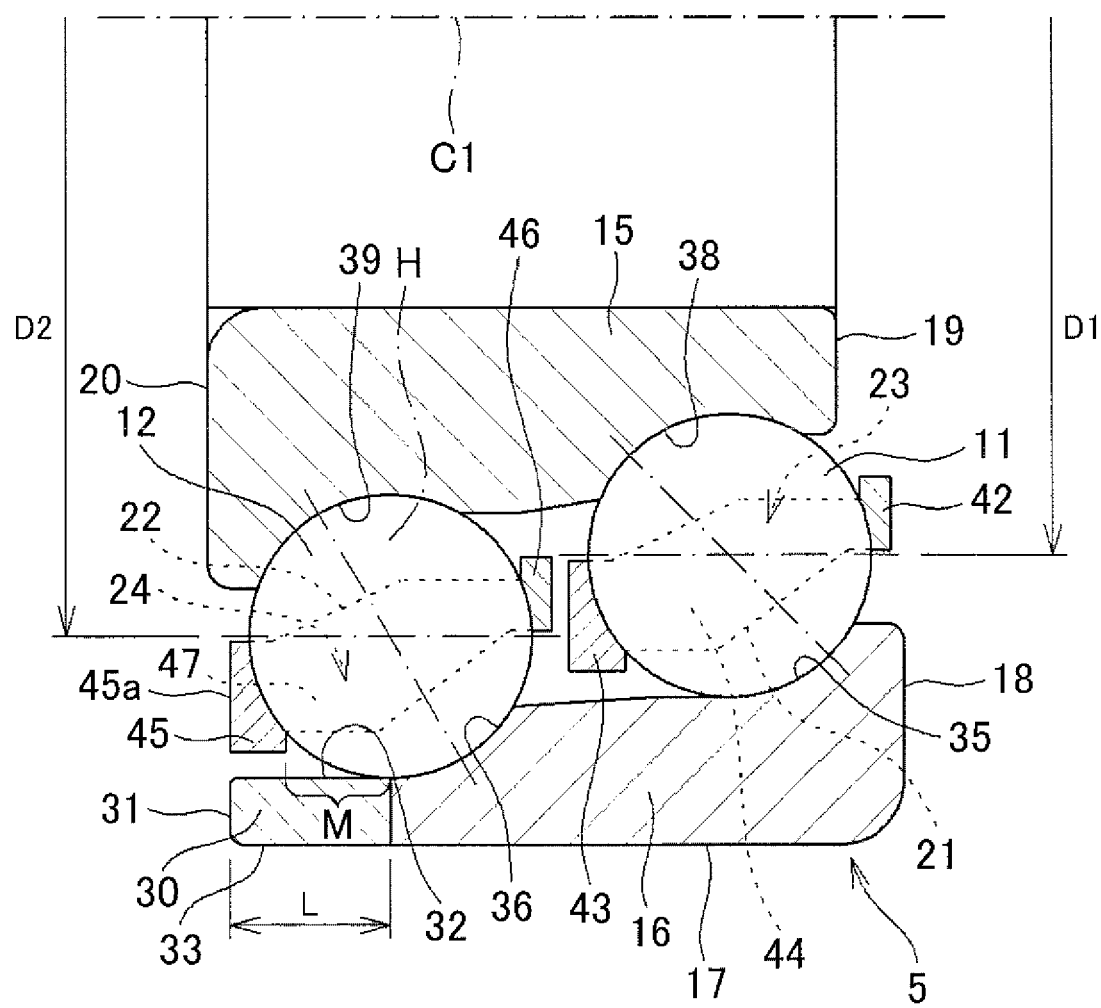
FIG. 5 is a sectional view illustrating a double row ball bearing according to another embodiment of the invention.

FIG. 5 is a sectional view illustrating a double row ball bearing 5 according to another embodiment of the invention. In each of the configurations illustrated in FIG. 2 to FIG. 4, the annular portion 30 is integral with the outer ring 16. However, an annular portion 30 illustrated in FIG. 5 is formed of an annular member that differs from an outer ring 16 (an annular member prepared separately from the outer ring 16). The other structures are the same as those in each of the above-described configurations, and thus description thereof will be omitted.

The annular portion 30, which is a member prepared separately from the outer ring 16, is disposed adjacent to the outer ring 16 in the axial direction, and is fitted together with the outer ring 16 to the annular wall 50a (see FIG. 1). When the annular portion 30 is a member prepared separately from the outer ring 16, the double row ball bearing 5 is formed of the annular portion 30 and the outer ring 16. A conventional outer ring may be employed as the outer ring 16. As the configuration in which the annular portion 30 is formed of a member prepared separately from the outer ring 16, other configurations than the configuration illustrated in FIG. 5 may be employed. For example, the same configurations as those in the modified examples 1) to 3) illustrated in FIG. 3A to FIG. 3C may be employed. In this case, the axial length of the annular portion 30 is changed as illustrated in FIG. 3A to FIG. 3C. In addition, the configuration described with reference to FIG. 4 may also be employed.

Figure 6:
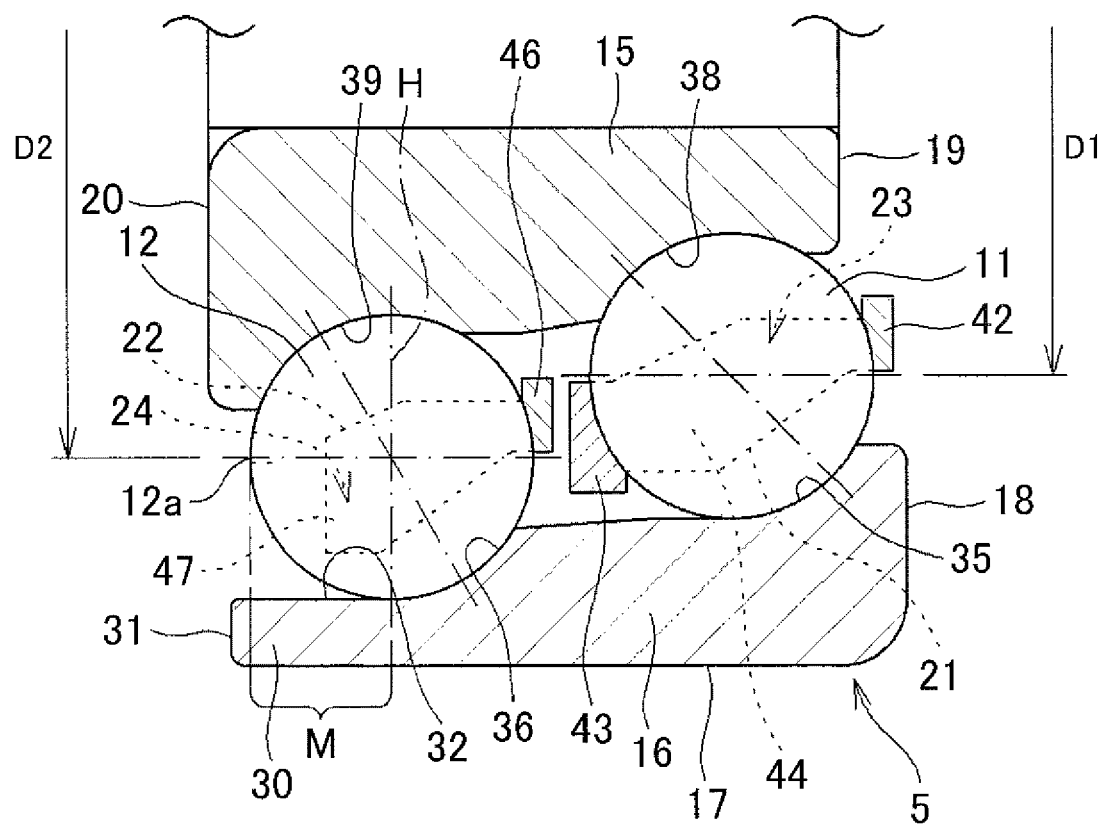
FIG. 6 is a sectional view illustrating a double row ball bearing according to yet another embodiment of the invention.

FIG. 6 is a sectional view illustrating a double row ball bearing 5 according to yet another embodiment of the invention. The second cage 22 in each of the above-described embodiments and the modified examples has a configuration in which the outer annular portion 45 is coupled to the inner annular portion 46 by the cage bars 47. However, a second cage 22 according to the embodiment illustrated in FIG. 6 does not include an axially outer annular portion, and the cage bars 47 extend from the axially inner annular portion 46. In the second cage 22 according to the present embodiment, each region surrounded on three sides by the inner annular portion 46 and two cage bar 47 adjacent to each other in the circumferential direction is defined as a second pocket 24. A first cage 21 may also be configured such that each region surrounded on three sides by the inner annular portion 43 (or the outer annular portion 42) and two cage bar 44 adjacent to each other in the circumferential direction is defined as a first pocket 23.

In the embodiment illustrated in FIG. 6 as well, the annular portion 30 covers, together with the outer ring 16, the entirety of a portion of each of the second balls 12 held in the second pockets 24 of the second cage 22, from the radially outside. The portion of each second ball 2 is exposed on the outside of the second pocket 24 and is oriented radially outward. In the embodiment illustrated in FIG. 6, the axial position of the axially outer end surface 31 of the annular portion 30 coincides with the axial position of an axially outer end portion 12a of each of the second balls 12 held in the second pockets 24. Although not illustrated, the axial position of the axially outer end surface 31 of the annular portion 30 may be located radially outward of the axially outer end portion 12a of each of the second balls 12.

Figure 7:
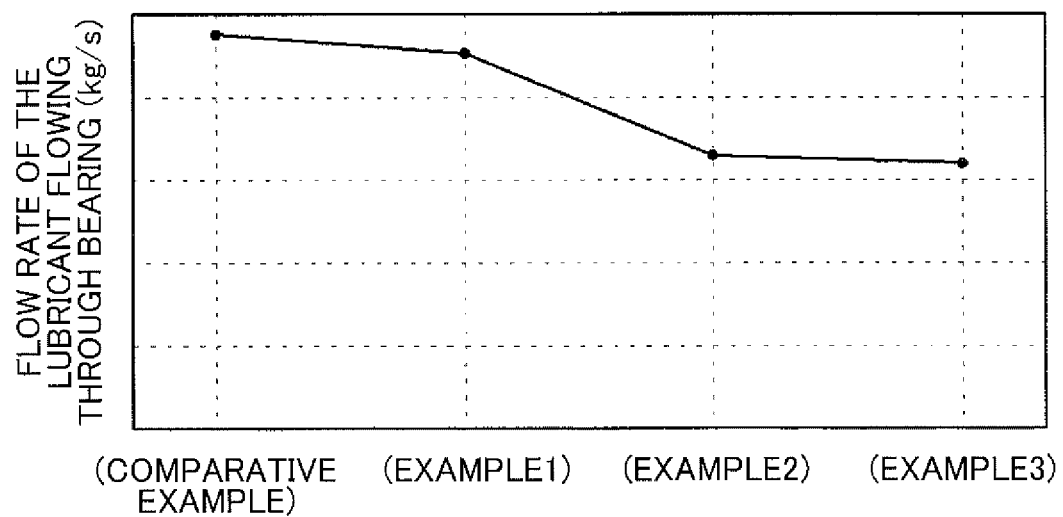
FIG. 7 is a graph illustrating the results of analysis of a lubricant flowing through an internal space of each double row ball bearing.

FIG. 7 is a graph illustrating the results of analysis of the lubricant flowing through the internal space in each double row ball bearing. The ordinate axis of the graph illustrated in FIG. 7 represents a flow rate of the lubricant flowing through the internal space between the outer ring and the inner ring of each double row ball bearing. The abscissa axis of the graph represents Comparative Example, Example 1, Example 2, and Example 3 in this order from the left side. The analysis conditions were set on the assumption that each bearing is rotating in the lubricant. The physical property of the lubricant was equivalent to VG 46.

Figure 8A:
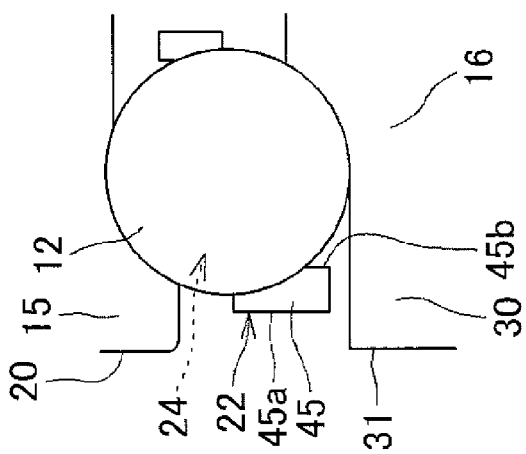
FIG. 8A to FIG. 8D are views illustrating models used in the analysis.
Figure 8B:
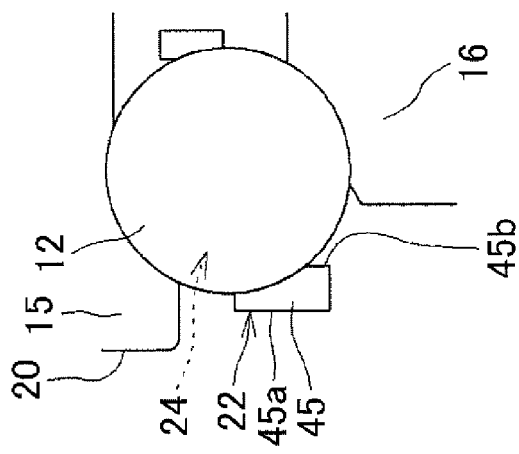
Figure 8C:
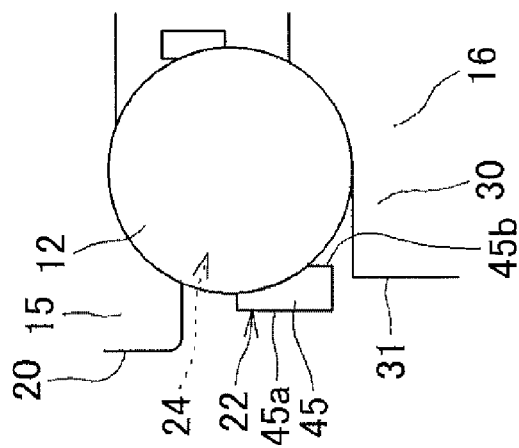

In Example 1, as illustrated in FIG. 8A, the axial position of the axially outer end surface 31 of the annular portion 30 is located between the axial position of the axially outer end surface 45a of the outer annular portion 45 and the axial position of the axially inner end surface 45b of the outer annular portion 45. In Example 2, as illustrated in FIG. 8B, the axial position of the axially outer end surface 31 of the annular portion 30 is located axially outward of the axially outer end surface 45a of the outer annular portion 45, and coincides with the axial position of the axial end surface 20 of the inner ring 15. In Example 3, as illustrated in FIG. 8C, the axial position of the axially outer end surface 31 of the annular portion 30 is located axially outward of the axially outer end surface 45a of the outer annular portion 45, and located axially outward of the axial end surface 20 of the inner ring 15.

Figure 8D:
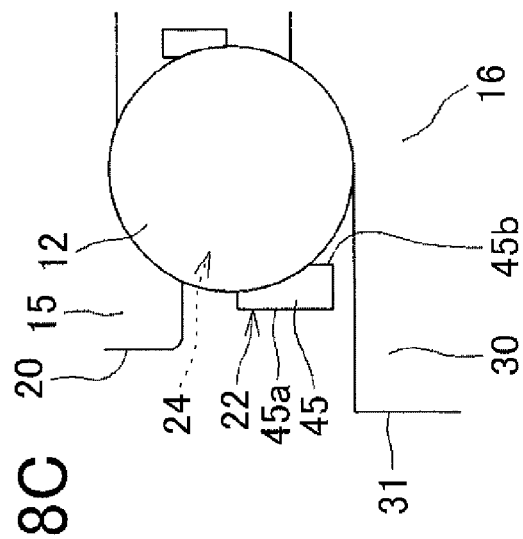

In each of Examples 1 to 3, the annular portion 30 covers, together with the outer ring 16, the entirety of a portion of each of the second balls 12 held in the second pockets 24 of the second cage 22, from the radially outside. The portion of each second ball 2 is exposed on the outside of the second pocket 24 and is oriented radially outward. As illustrated in FIG. 8D, the double row ball bearing according to Comparative Example includes no annular portion 30. Specifically, only approximately half a portion of each of the second balls 12 held in the second pockets 24 of the second cage 22 is covered with the outer ring 16 from the radially outer side. The portion of each second ball 12 is exposed on the outside of the second pocket 24 and is oriented radially outward.

As illustrated in the graph of FIG. 7, in Example 1, the flow rate of the lubricant flowing through the internal space of the bearing is lower than that in Comparative Example. Thus, in Example 1, the above-described function as a "flow-rate reducer" is provided by the annular portion 30. In each of Example 2 and Example 3, the flow rate of the lubricant is significantly lower than that in Comparative Example. Thus, in each of Example 2 and Example 3, the above-described function as a "flow-rate reducer" is provided by the annular portion 30. Example 3 has an approximately 30% reduction in flow rate over Comparative Example. According to Example 2 and Example 3, the flow rate is significantly lower than that in Comparative Example. Thus, it was found that the longer the axial length of the annular portion 30 is, the lower the resistance in the flow passage formed between the outer ring 16 and the inner ring 15 is and the lower the flow rate of the lubricant flowing through the flow passage is.

The above description regarding the configurations of the double row ball bearing is provided on the double row ball bearing 5 located near the pinion gear 53 of the differential gear mechanism illustrated in FIG. 1. Note that, the double row ball bearing 7 located on the flange 54 side may have the same configuration as that of the double row ball bearing 5 located on the pinion gear 53 side. This means that the double row ball bearing 7 on the flange 54 side may have an annular portion that covers the balls from the radially outside. In the double row ball bearing 5 (7) in each of the foregoing embodiments and modified examples, the foreign objects contained in the lubricant P1 are hindered from being stuck in between the second balls 12 and the raceway grooves 36, 39 of the outer ring 16 and the inner ring 15, and in between the first balls 11 and the raceway grooves 35, 38 of the outer ring 16 and the inner ring 15. This makes it possible to extend the bearing service life. As a result, it is possible to extend the service life of the differential gear mechanism.

The double row ball bearings 5, 7 and the shaft support device including the double row ball bearings 5, 7 according to the invention are not limited to those illustrated in the drawings, and may have various other configurations within the scope of the invention. For example, the above description is provided on the case where the double row ball bearings 5, 7 are applied to the differential gear mechanism. Alternatively, the double row ball bearings according to each of the aforementioned embodiments and modified examples may be applied to other shaft support devices.

What is claimed is:

1. A double row ball bearing comprising:
   an outer ring;
   an inner ring;
   a plurality of first balls disposed between the outer ring and the inner ring to form a first ball row;
   a plurality of second balls disposed between the outer ring and the inner ring to form a second ball row having a pitch circle diameter larger than a pitch circle diameter of the first ball row;
   a first cage in an annular shape, the first cage having a plurality of first pockets in which the first balls are held;
   a second cage in an annular shape, the second cage having a plurality of second pockets in which the second balls are held; and
   an annular portion that covers, together with the outer ring, the entirety of a portion of each of the second balls held in the second pockets from a radially outside, the portion being exposed on an outside of the second pocket and oriented radially outward,
   wherein an axially outer end surface of the annular portion is located at an axial position within a range from an axially outer end surface of an outer annular portion of the second cage to an axially inner end surface of the outer annular portion of the second cage in an axial direction.

2. The double row ball bearing according to claim 1, wherein:
   the second cage includes the outer annular portion located axially outward of the second balls, and a plurality of cage bars extending axially inward from the outer annular portion; and
   a radial dimension of an outer annular clearance between an outer peripheral surface of the outer annular portion and an inner peripheral surface of the annular portion is equal to or less than 20% of a radial dimension of an annular space between the inner peripheral surface of the annular portion and an outer peripheral surface of an axial end portion of the inner ring, the axial end portion being located on the second ball side.

3. The double row ball bearing according to claim 1, wherein a diameter of an outer peripheral surface of an axial end portion of the inner ring, the axial end portion being located on the second ball side, is equal to or larger than 70% of a diameter of an inner peripheral surface of the annular portion.

4. The double row ball bearing according to claim 1, wherein:
   the second cage includes the outer annular portion located axially outward of the second balls, and a plurality of cage bars extending axially inward from the outer annular portion; and
   a diameter of an outer peripheral surface of the outer annular portion is equal to or larger than 80% of a diameter of an inner peripheral surface of the annular portion.

5. The double row ball bearing according to claim 1, wherein:
   an inner peripheral surface of the annular portion is a cylindrical surface parallel to a central line of the outer ring; and the cylindrical surface is not subjected to a finishing process.

6. The double row ball bearing according to claim 1, wherein the annular portion is an annular member that differs from the outer ring.

7. A shaft support device comprising:
a case;
a gear mechanism including a large-diameter gear and a small-diameter gear that are disposed in the case;
a shaft that rotates together with the small-diameter gear; and
the double row ball bearing according to claim 1, by which the shaft is rotatably supported.

* * * * *